United States Patent
Kopecek et al.

(10) Patent No.: US 7,516,940 B2
(45) Date of Patent: Apr. 14, 2009

(54) ELECTROMAGNETIC ACTUATORS

(75) Inventors: Herbert Kopecek, Hallbergmoos (DE); Michael Bernhard Schmitz, Freising (DE); Paolo Battagli, Sesto Fiorentino (IT); Francesco Grillo, Florence (IT)

(73) Assignee: General Electric Company, Niskayuna, NY (US)

( * ) Notice: Subject to any disclaimer, the term of this patent is extended or adjusted under 35 U.S.C. 154(b) by 222 days.

(21) Appl. No.: 11/420,590

(22) Filed: May 26, 2006

(65) Prior Publication Data
US 2007/0272890 A1 Nov. 29, 2007

(51) Int. Cl.
*F16K 31/02* (2006.01)
(52) U.S. Cl. .............. 251/129.16; 251/129.15; 335/297
(58) Field of Classification Search ............ 251/129.15, 251/129.16; 123/90.11; 335/297
See application file for complete search history.

(56) References Cited

U.S. PATENT DOCUMENTS

| | | | |
|---|---|---|---|
| 3,653,783 A | 4/1972 | Sauder | |
| 4,515,343 A | 5/1985 | Pischinger et al. | |
| 5,074,259 A | 12/1991 | Pusic | |
| 6,279,524 B1* | 8/2001 | Schebitz | 123/90.11 |
| 6,308,667 B1* | 10/2001 | Tsai et al. | 123/90.11 |
| 6,477,994 B2* | 11/2002 | Umemoto et al. | 123/90.11 |
| 6,588,385 B2* | 7/2003 | Fuwa | 123/90.11 |

OTHER PUBLICATIONS

W.S. Chang, et al., "A New Electromagnetic Valve Actuator", IEEE Workshop on Power Electronics in Transportation, Oct. 2002, pp. 109-118.

* cited by examiner

*Primary Examiner*—John K Fristoe, Jr.
(74) *Attorney, Agent, or Firm*—Patrick K. Patnode

(57) ABSTRACT

A valve comprises an electromagnetic actuator including a solenoid. The solenoid includes at least one core, wherein the core is an "E" shaped core or a "U" shaped core and an anchor plate. The solenoid further comprises at least one coil disposed within the core and connected to a set of power electronics to supply current to the coils. The actuator further comprises a plunger connected to the anchor plate and at least one spring configured to guide the plunger. The opening and closing of the valve is controlled by passing current through the coil and the valve is used in acompressor.

14 Claims, 16 Drawing Sheets

US 7,516,940 B2

ELECTROMAGNETIC ACTUATORS

BACKGROUND OF THE INVENTION

The invention relates generally to electromagnetic valve actuators for controlling valve operation. More particularly, the invention relates to electromagnetic actuators for controlling valve timing in compressors.

One technique to control the load of large compressors is to actively control the opening time of the suction valves of the compressor. When the load on the compressor is low, the suction valves are kept open for a longer period of time compared to compressors handling higher loads. Typically for a no-load condition, the suction valves of the compressor are kept open for the entire period of operation. In a reverse situation, for a full load condition, the suction valves operate without any active control on the opening and closing of the valves.

Currently, either pneumatic or hydraulic actuators establish active control of opening time of the suction valve. Both techniques need a separate supply of hydraulic/gas pressure and oil/gas pressure pipes to connect each actuator to the supply system, which supply system is expensive and has to be maintained regularly. Furthermore, pneumatic actuators cannot achieve high actuation speeds and may not be suitable to be used for continuous control of valve position in each compression cycle.

Therefore there is a need for an efficient, inexpensive and low maintenance actuator for controlling the valves in a compressor.

BRIEF DESCRIPTION OF THE INVENTION

In one aspect, a valve comprises an electromagnetic actuator including a solenoid. The solenoid includes at least one core, wherein the core is an "E" shaped core or a "U" shaped core and an anchor plate. The solenoid further comprises at least one coil disposed within the core and connected to a set of power electronics to supply current to the coils. The actuator further comprises a plunger connected to the anchor plate and at least one spring configured to guide the plunger. The opening and closing of the valve is controlled by passing current through the coil and the valve is used in a compressor.

In another aspect, a valve comprises an electromagnetic actuator including a solenoid. The solenoid includes at least one core, wherein the core is an "E" shaped core or a "U" shaped core and an anchor plate. The solenoid further comprises at least one coil disposed within the core and connected to a set of power electronics to supply current to the coils. The actuator further comprises a plunger connected to the anchor plate and at least one spring configured to guide the plunger. The opening and closing of the valve is controlled by passing current through the coil and the valve is used as a suction valve in a compressor.

In yet another aspect, a valve comprises an electromagnetic actuator, said electro magnetic actuator including a solenoid. The solenoid includes a first core and a first spring and a second core and a second spring and an anchor plate disposed in between the first and second cores. The first core and second core are "E" shaped cores or "U" shaped cores. The solenoid further includes a first coil disposed within the first core and a second coil disposed within the second core. The first and second coils are connected to a set of power electronics to supply current to the first and second coils. The actuator further includes a plunger connected to the anchor plate and at least one spring configured to guide the plunger. The opening and closing of the valve is controlled by passing current through the first coil and second coil and the valve is used in a compressor.

DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
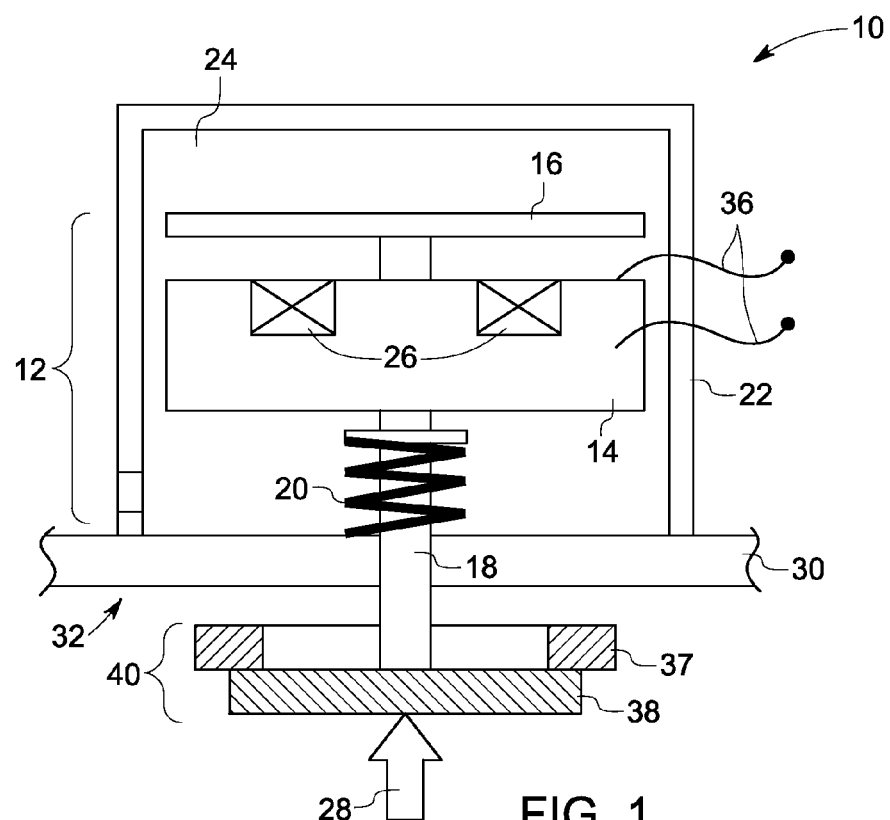
FIG. 1 illustrates an exemplary electromagnetic actuator in OFF position.
Figure 2:
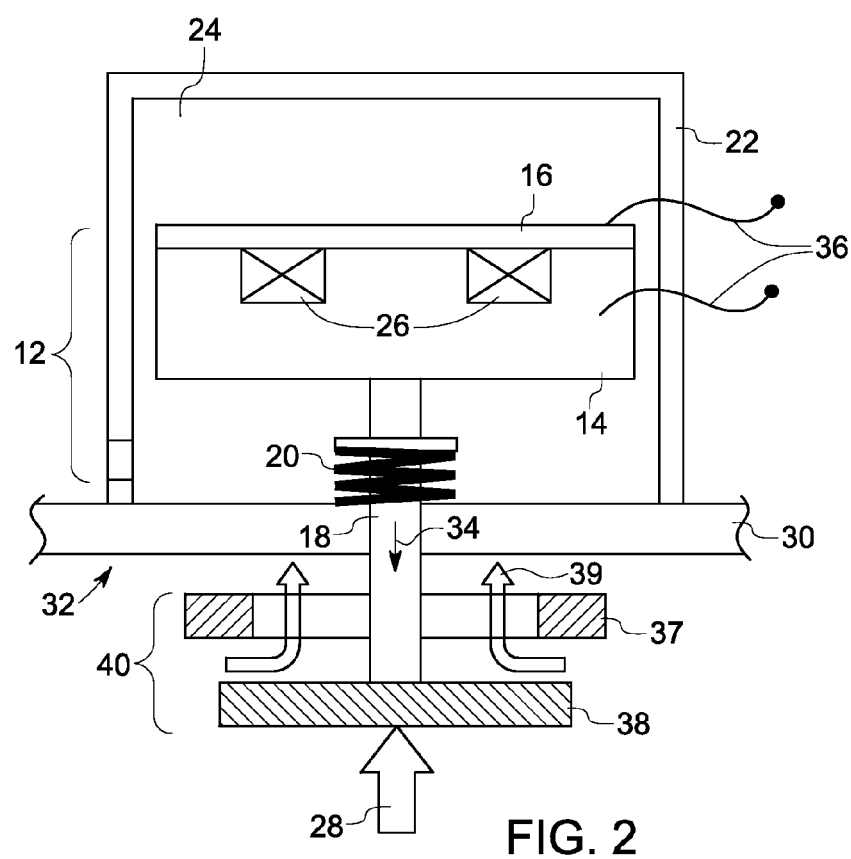
FIG. 2 illustrates an exemplary electromagnetic actuator in ON position.

FIGS. 1 and 2 illustrate an exemplary electromagnetic actuator 10, including a solenoid 12 and a plunger 18 disposed within a housing 22. The electromagnetic actuator 10 may be coupled to a valve 40 configured to move between a closed position (FIG. 1) and an open position (FIG. 2) to prevent or permit flow respectively. The solenoid 12 comprises at least one core 14, for example, an "E" shaped core or a "U" shaped core. The solenoid 12 also includes an anchor plate 16 and at least one coil 26 disposed within the core 14. The coils 26 are connected to a power supply 36 configured to supply current to the coils 26.

As shown in FIG. 1, the exemplary actuator 10 includes two coils 26 disposed within the core 14. The plunger 18 is coupled to the anchor plate 16. The valve 40 comprises a valve seat 37 and a valve closing element 38. The valve 40 may be kept in an open position by a downward movement of the plunger 18 against the valve closing element 38. The movement of the plunger 18 is controlled by passing current through the coils 26 within the core 14. In some embodiments, the plunger 18 may be coupled to the closing element 38 to actively open and close the valve 40. FIG. 1 illustrates a configuration, in which the power supply 36 to the coils 26 is switched off and the actuator 10 is in "off" position with the valve 40 in a closed position. FIG. 2 illustrates the same actuator 10 shown in FIG. 1 in an "on" position. In operation, when electrical current is supplied to the coils 26, the core 14 generates an electromagnetic force and the anchor plate 16 is pulled towards the core 14 due to this electromagnetic force. As the anchor plate 16 is pulled towards the core 14, the plunger 18 connected to the anchor plate 16 is pushed downward. As a result of this downward movement (shown by the arrow 34) of the plunger 18, the valve closing element 38 is pushed away from a valve seat 37 and the valve 40 opens. As long as the electrical current is supplied to the coils 26, the electromagnetic force generated by the core 14 holds the anchor plate 16 close to the core 14, thus keeping the valve 40 open against the force that is generated by the reverse gas flow 39 through the valve 40.

The actuators discussed herein may be used in valves in a reciprocating compressor. In one embodiment, the actuator is used in the suction valves of the compressor, to keep the suction valve in an open position for a certain period of time. The longer the suction valve is kept in an open position during the compression stroke, the more gas that is pushed back into the suction line and the less gas that is delivered to the compressor discharge line. In this way, the amount of gas delivered by the compressor can be controlled by the opening time of the suction valve.

The exemplary actuator 10 as shown in FIGS. 1-2 further includes one or more springs 20. The springs may comprise, for example, helical or plate springs. As shown in FIGS. 1-2, the actuator 10 includes a helical spring 20 coupled to the plunger 18 and a wall 30. The wall 30 separates the actuator 10 from a compressor suction zone 32. In operation, the spring 20 assists the movement of the plunger 18 by maintaining the plunger 18 along a longitudinal axis. When the plunger moves the valve 40 into the open position (FIG. 2) the spring(s) 20 is compressed. Once the electromagnetic force is released, the plunger 18 moves the valve 40 into a closed position and is assisted in closure by the force generated by the compressed spring 20.

As discussed in the preceding sections, the shape of the core of the actuators described herein may be, for example, an "E" shape or a "U" shape. To generate a high electromagnetic force in the core in a very short span of time, the core of the solenoid as well as the anchor plate are typically manufactured out of metal sheets to avoid eddy current effects as eddy current growing in the core may reduce the magnetic flux produced by the electromagnetic force. In order to facilitate reasonable ease of fabrication of the core out of metal sheets, a suitable design configuration should be used. The exemplary "E" shaped or "U" shaped cores described herein can be easily fabricated from metal sheets such as an iron sheet. Furthermore the "E" shaped core also provides a large area for the poles developed in the core once the coils are energized. Since the plunger is aligned through the center of the "E" shaped core, the magnetic force generated is distributed uniformly on both sides of the plunger (due to the uniform location of the coils 26 with respect to the center of the "E" core 14) and the movement of the plunger due the electromagnetic force may be balanced adequately.

Figure 3:
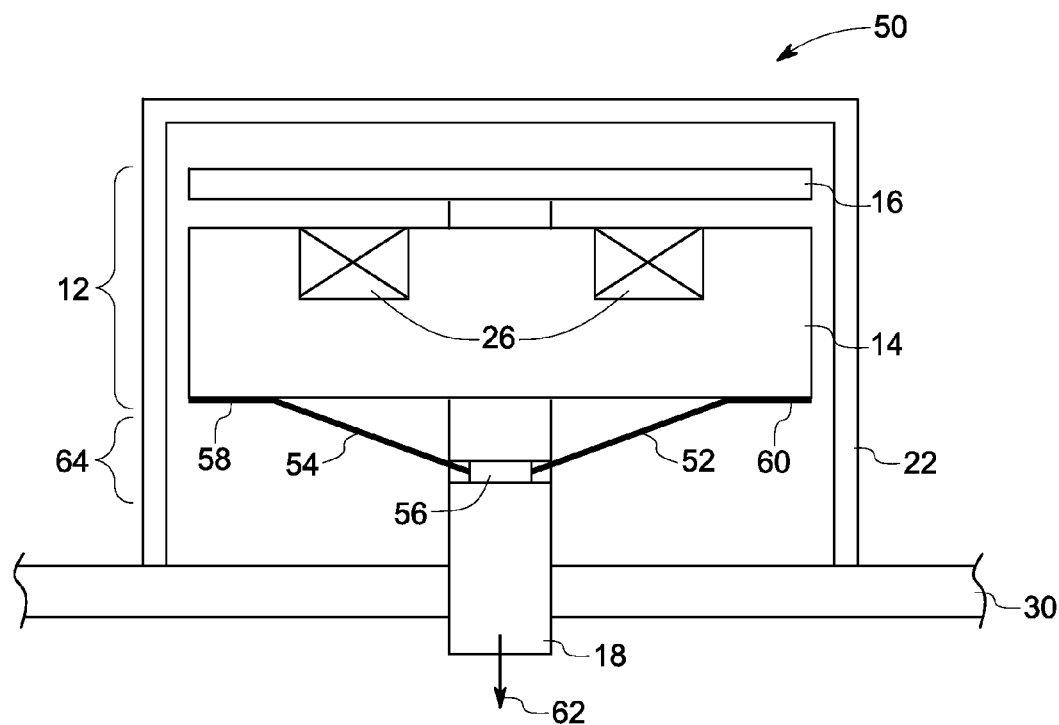
FIG. 3 illustrates an exemplary electromagnetic actuator with plate springs.

FIG. 3 illustrates an exemplary actuator 50 including a plate spring 64. The plate spring 64 includes two arms 52 and 54 attached to the plunger 18 through a connection 56. The first arm 52 is coupled at a first end 60 to the core 14 and at a second end 56 to the plunger 18. The second arm 54 is coupled at a first end 58 to the core 14 and at the second end 56 to the plunger 18. When the coils 26 are energized, the anchor plate 16 is magnetically attracted to the core 14 and the arms 54 and 52 of the plate spring 64 are forced into a compressed position as the plunger 18 moves downward along path 62. Another function of the plate spring 64 is to act as a guide for the plunger 18 and to align the core 14 with the plunger 18. This alignment is possible as the arms 52 and 54 of the plate spring 64 are uniformly connected to either sides of the core 14.

Figure 4:
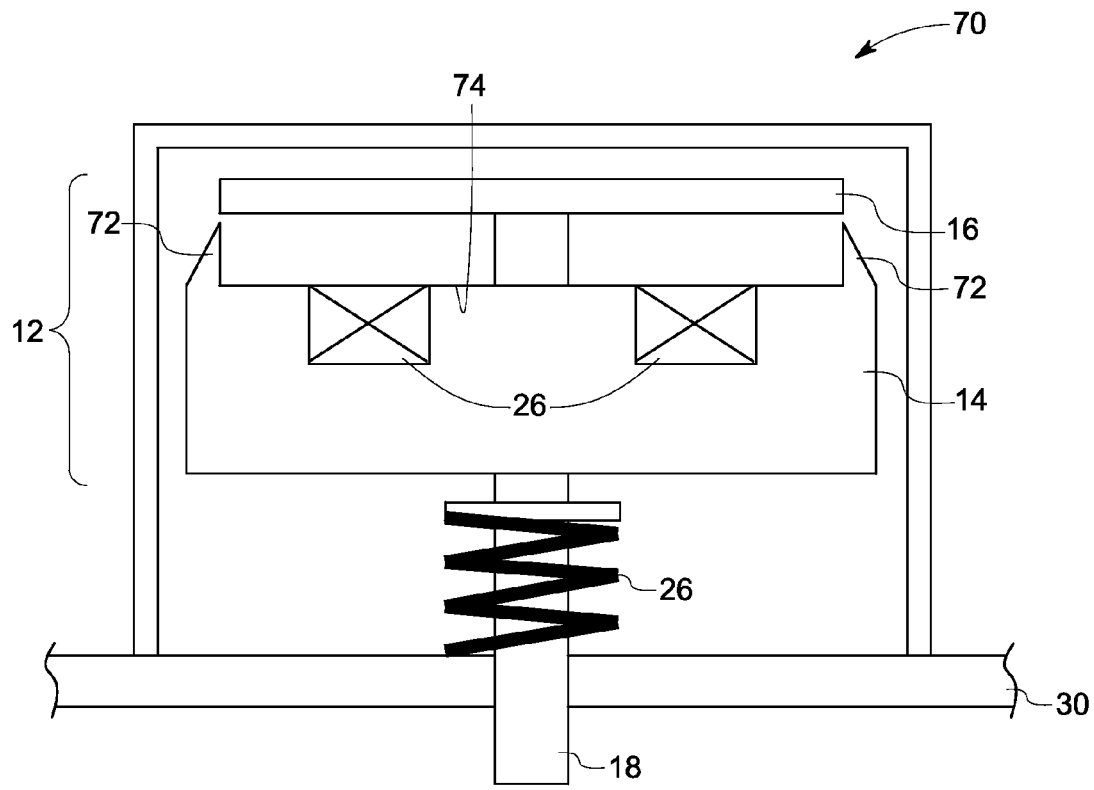
FIG. 4 illustrates an exemplary electromagnetic actuator with spikes at the edge of the core.

FIG. 4 illustrates an exemplary electromagnetic actuator 70 further comprising spikes 72 at the edge of the core 14. As described above, in operation, when the electrical supply 36 is turned on, the coils 26 are energized and the anchor plate 16 is magnetically attracted to the core 14. As discussed above, in one embodiment of the instant invention, the electromagnetic actuator is used in a reciprocating compressor. Typically, the gas force within a compressor would act against the magnetic force of the actuator in several ways. A nearly constant force 28 (as shown in FIGS. 1-2) pushes against the valve 40. This constant force 28 is a result of the pressure differential between the suction zone 32 and the housing 22. The pressure inside the housing 22 is typically equal to the ambient pressure. The suction zone 32 is typically under an elevated pressure. Additionally, a drag force pulls on the valve created from the pressure drop across the valve 40.

In operation, in order to balance the constant gas forces, the core 14 of the actuator can be adapted to have a configuration as shown in FIG. 4. The spikes 72 on both sides of the core 14 are configured to achieve higher initial forces at the beginning of a stroke to balance the constant gas force acting on the plunger 18. Accordingly, the holding force at the end of the stroke is proportionally reduced. When the coils 26 are energized, the magnetic flux developed within the core 14 is guided from the core 14 through the spikes 72 to the anchor plate 16 during the initial phase of the stroke as the spikes 72 are closest to the anchor plate 16. In the compression cycle, closer to the end of the stroke, the main magnetic flux goes through the flat surface 74 of the iron core 14 facing the anchor plate 16 as the air gap between the core 14 and the plunger 16 becomes smaller. So at the end of the stroke, when the anchor plate 16 is close to the core 14, the magnetic flux generated from the flat surface 74 of the core 14 becomes the main flux to pull the plunger 18. The magnetic flux guided through the spikes 72 at this stage does not contribute to holding the anchor plate 16 close to the core 14. Therefore, in operation, the actuator 70 has a higher initial force and lower holding force as explained above.

Figure 5:
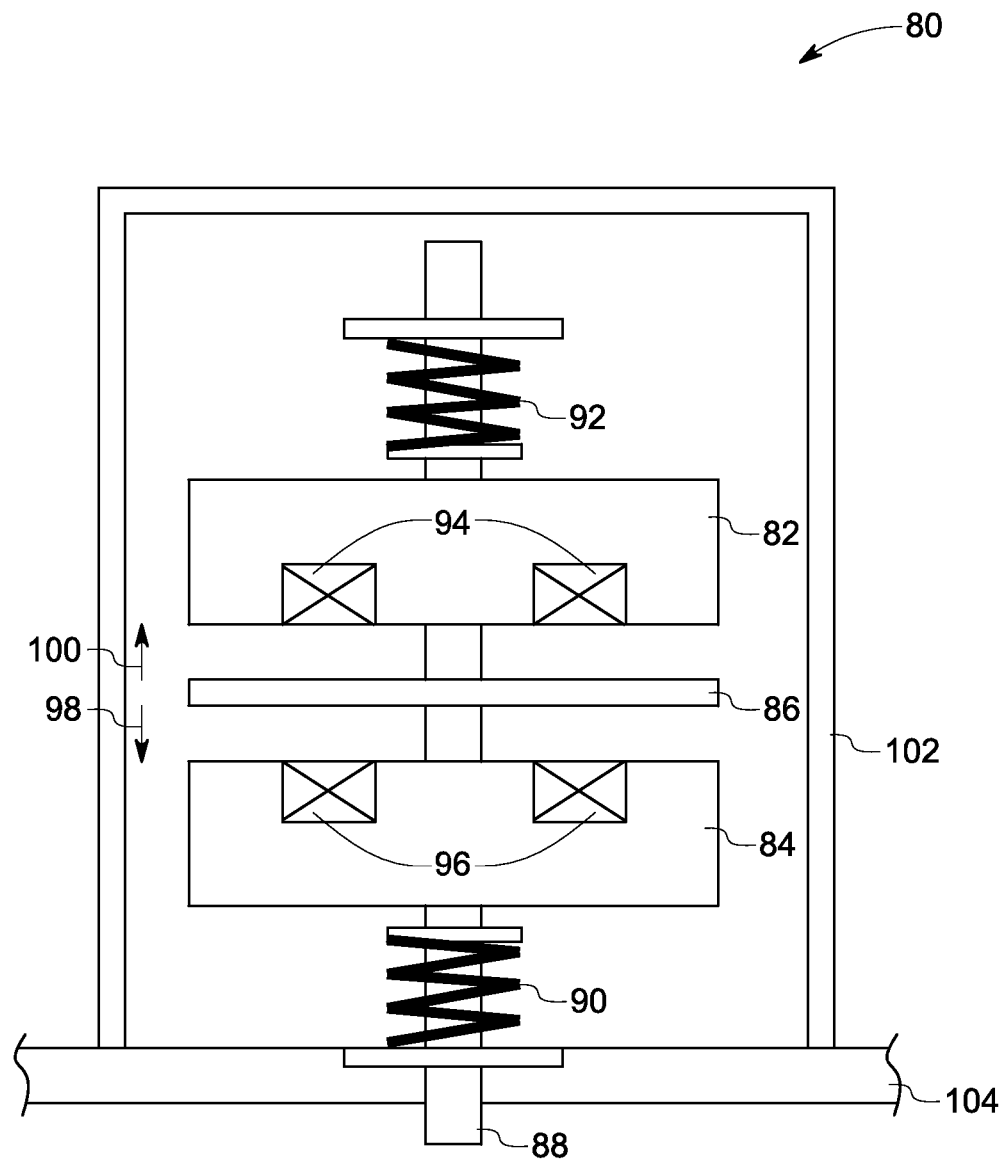
FIG. 5 illustrates an exemplary bi-directional electromagnetic actuator.
Figure 6:
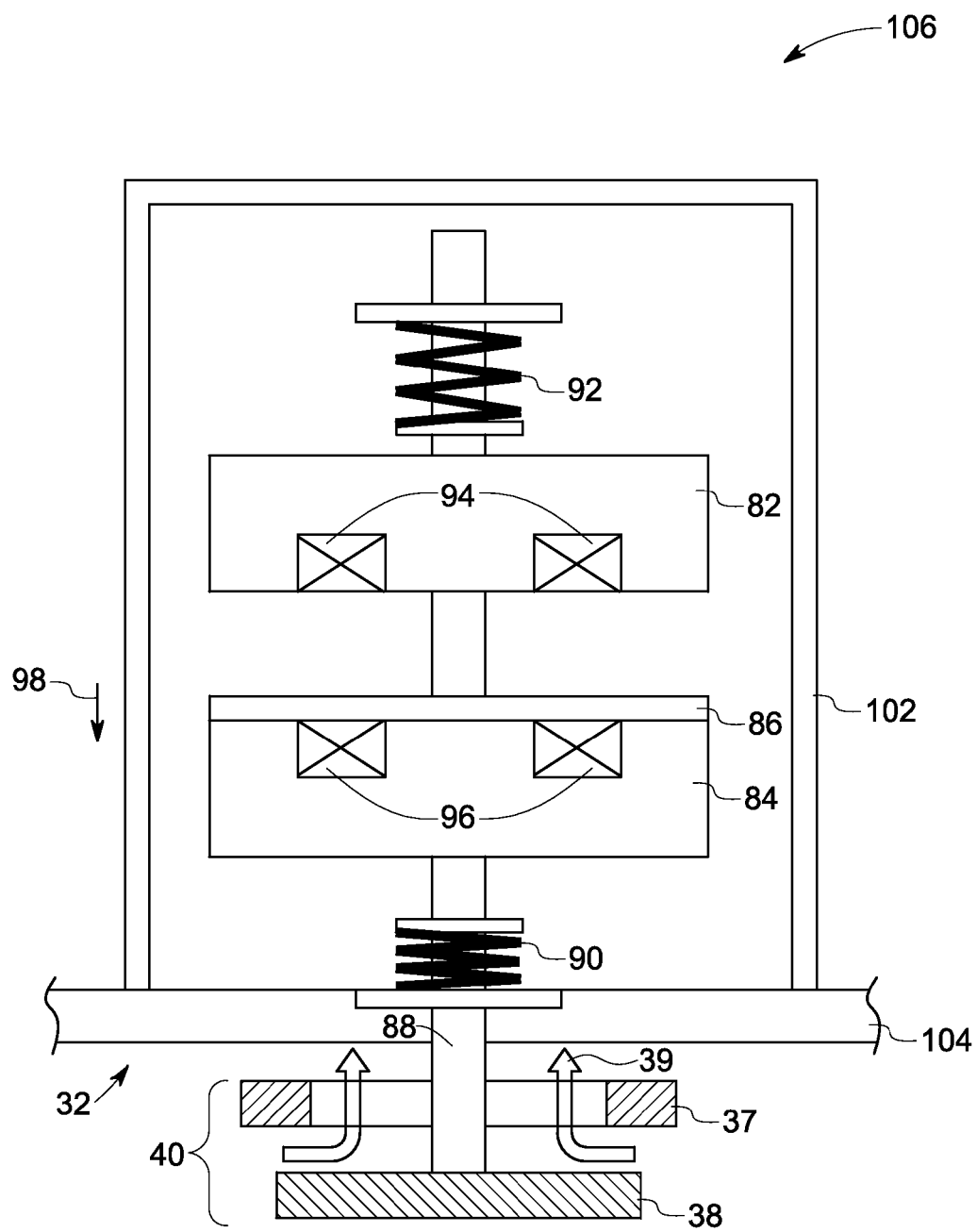
FIG. 6 illustrates the exemplary bi-directional electromagnetic actuator of FIG. 5 in "on" position.
Figure 7:
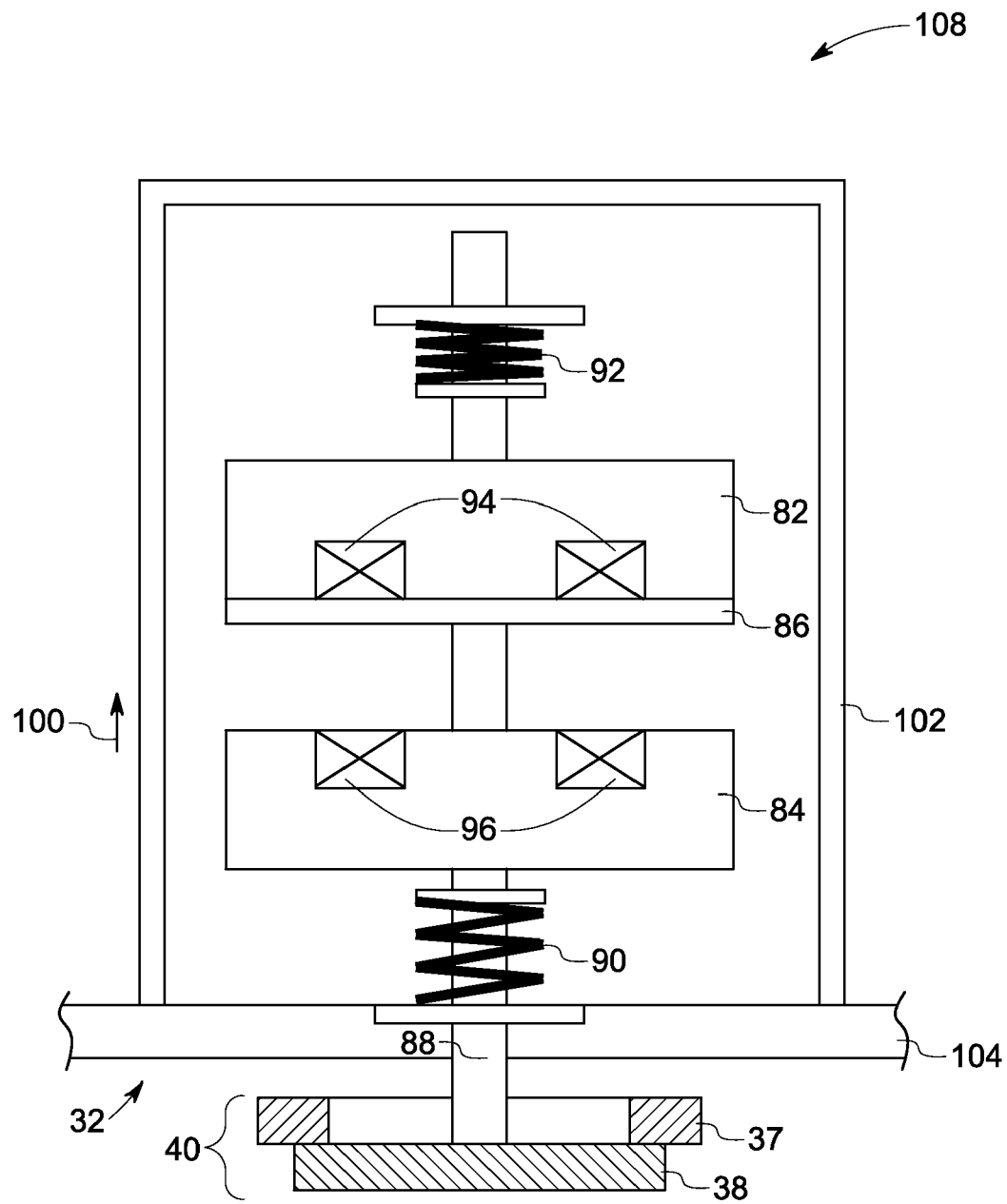
FIG. 7 illustrates the exemplary bi-directional electromagnetic actuator of FIG. 5 in "off" position.

FIGS. 5-7 illustrate an exemplary bi-directional (BDE design) electromagnetic actuator 80. The actuator 80 includes two cores, a first core 82 and a second core 84. The cores may be made of iron or any other metal sheets with good magnetic properties to decrease size and weight of the actuator. In one embodiment, the cores are made of iron-cobalt alloys. The exemplary actuator 80 includes the first core 82 and the second core 84 having an "E" shape. In some other embodiments, the cores may have any other suitable shape including, but not limiting to "U" shape. The actuator 80 further includes a plunger 88 and an anchor plate 86 connected to the plunger 88. In some embodiments, the actuator may include four cores. The first core 82 includes a set of two coils 94 disposed within the first core 82. The second core 84 includes another set of two coils 96 disposed within the second core 84. In some embodiments, the cores may include more than two coils. The actuator 80 further includes a first spring 92 and a second spring 90 configured to provide forward and return forces to assist the movement of plunger 88 in both directions. The bi-directional actuator 80 enables the anchor plate 86 to move in forward and backward directions during the operation of the valve 40.

Operationally, the open position 106 of the valve 40 is achieved when the current through the coils 96 in the second core 84 is turned on. Once the coils 96 are energized, the plunger 88 is pulled towards the second core 84 (shown by arrow 98) thereby compressing the second spring 90. This is illustrated in FIG. 6, wherein, the plunger 88 pushes the valve seat 37 away from the valve closing element 38 to achieve the open position. Alternatively, the closed position of the valve 40 as shown in FIG. 7 is achieved when the current through the coils 96 is turned off and the current through the coils 94 in the first core 82 is turned on. As a result, the plunger 88 is pushed towards the first core 84 guided by the first spring 92 (as shown by the arrow 100) and the valve 40 closes. The bi-directional design of the actuator may cover longer strokes compared to the unidirectional designs (as shown in FIGS. 1-4) and provides a higher force during the initial stage of the stroke. This higher force is due to the fact that in both the end positions (either valve close or valve open) of the stroke, the preloaded compressed springs 90 or 92 provides a high initial force, which force pushes the plunger 88 and the anchor plate 86 towards the opposite core. Hence the spring force gets added to the weak magnetic forces, present at the beginning of the stroke due to the large air gap between anchor plate 86 and iron cores 82 and 84 and enhances the initial force.

Figure 8:
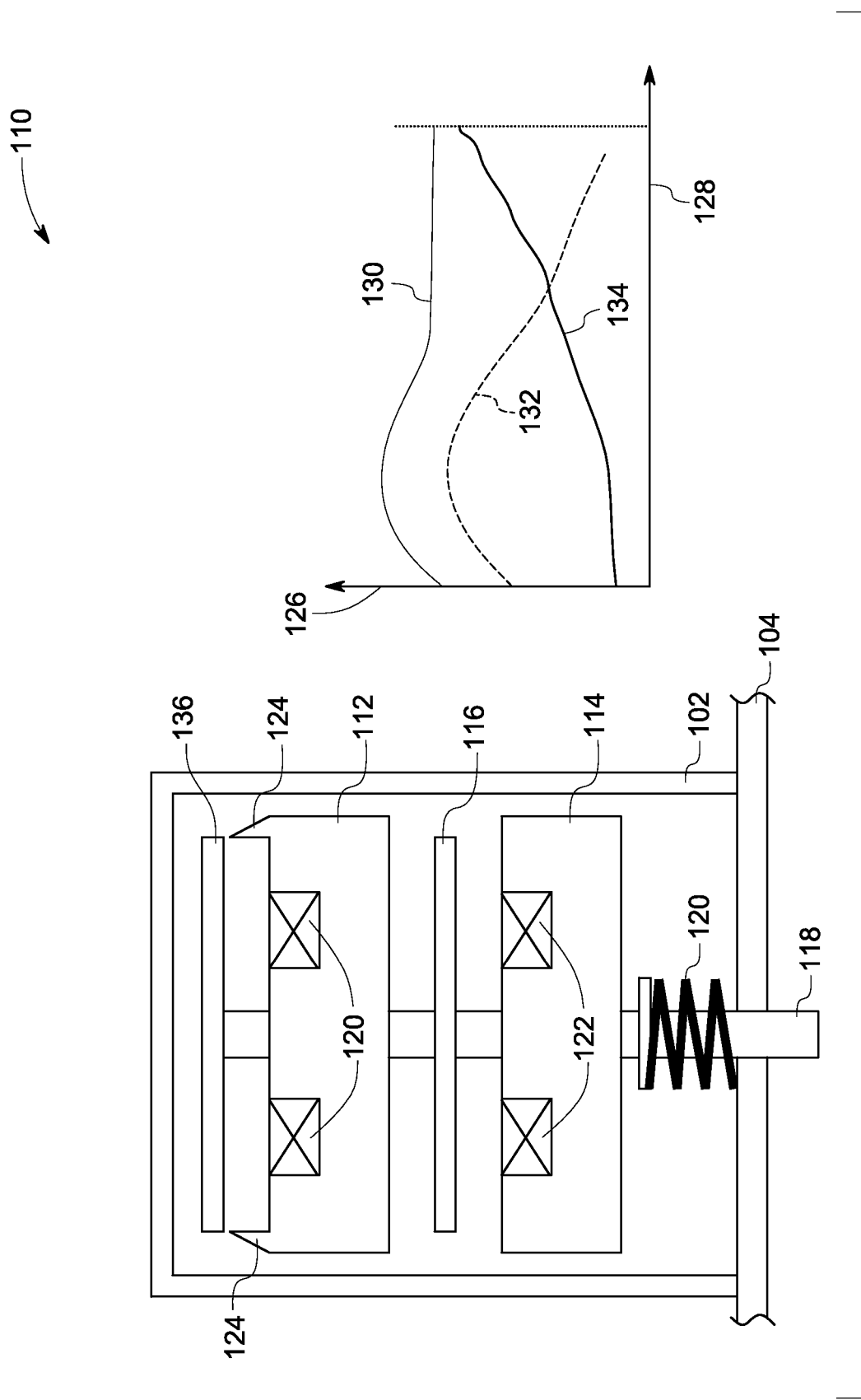
FIG. 8 illustrates another exemplary electromagnetic actuator.

FIG. 8 illustrates another exemplary electromagnetic actuator 110. The exemplary actuator 110 includes a first core 112 adapted to have spikes 124 at both ends of the first core 112. A set of coils 120 are disposed within the first core 112 and another set of coils 122 are disposed within the second core 114. In operation, once the coils 120 and 122 are energized, the anchor plate 116 is pulled towards the second core 114 and an additional plate 136 coupled to the plunger 118 is pulled towards the first core 112 thereby enhancing the downward motion of the plunger 118. Due to the spikes 124, the first core 112 may achieve higher initial forces but low holding force as explained above. As illustrated in FIG. 8, the plot shows the force developed in the actuator 110 while in operation. The "x" axis or the horizontal axis 128 shows the stroke and the vertical axis or the "y" axis 126 shows the actuator force. The curve 132 shows the actuator force developed in the first core 112 with spikes 124. As discussed before, the initial force developed by the first core 112 is higher as is evident from the curve 132. The second core 114 however has a lower initial force, but a higher holding force as is evident by the curve 134. The curve 130 projects the behavior of the actuator force, which behavior is the sum of the two curves 132 and 134. With such a force-stroke characteristics, the constant gas force acting on the plunger of the actuator may be balanced.

Figure 9:
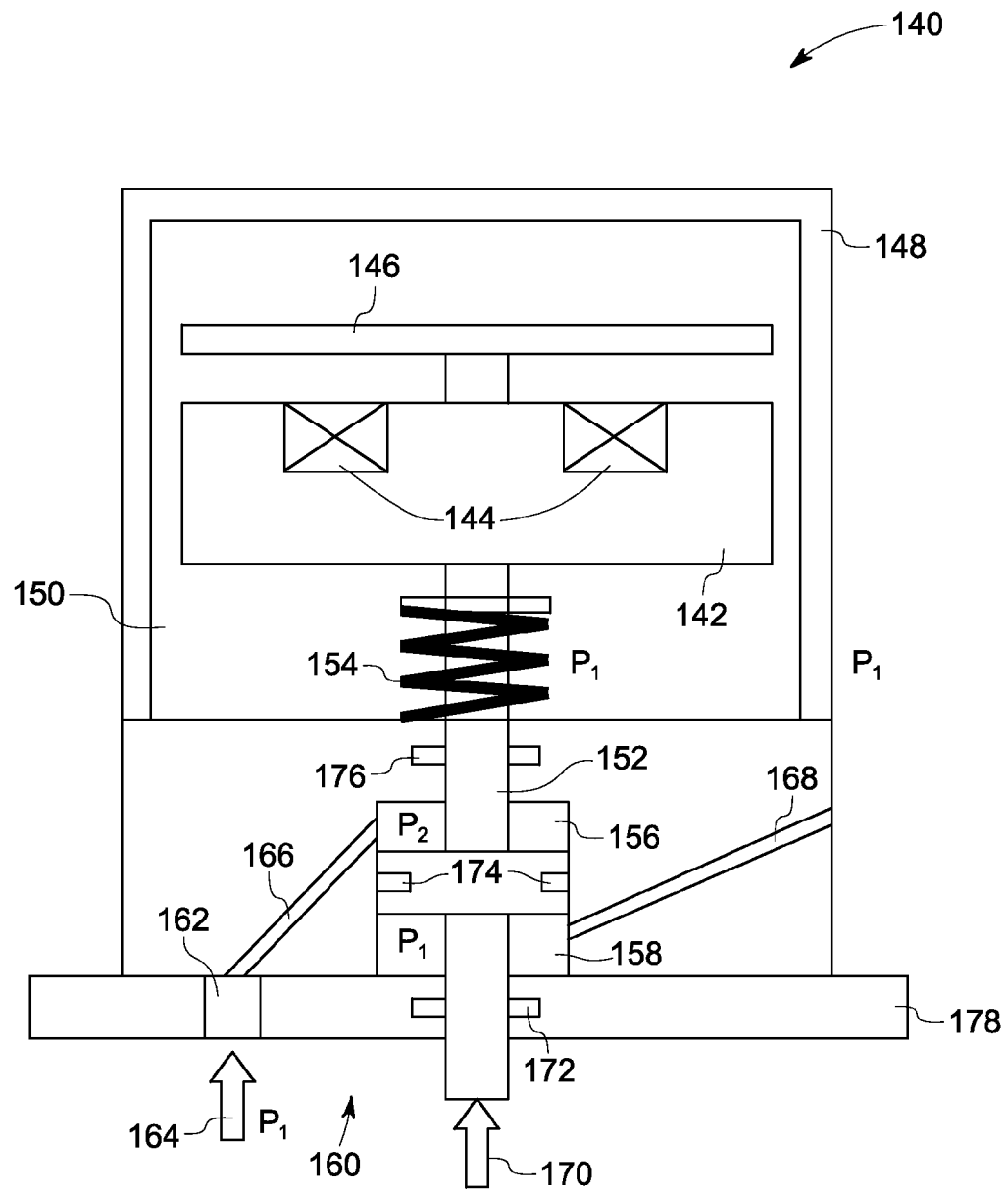
FIG. 9 illustrates an exemplary electromagnetic actuator with a pressure compensation system.

FIGS. 9-13 illustrate exemplary electromagnetic actuators with a pressure compensation system, wherein like elements are designated with like reference numerals. FIG. 9 illustrates an exemplary electromagnetic actuator 140 including a pressure compensation system. In the bi-directional designs of actuators as shown in the preceding sections, the gas force permanently acting against the magnetic force developed in the solenoid can be balanced by proper spring adjustment of both the springs of the actuator. However in unidirectional designs, in order to balance the gas force on the solenoid, an exemplary pressure compensation system is provided as shown in FIG. 9. The actuator 140 includes an anchor plate 146 connected to a plunger 152. The actuator further includes a core 142 including two coils 144 disposed in between and a spring 154. The actuator 140 is housed in a chamber 148. The pressure inside the chamber 148 is $P_1$, which pressure $P_1$ is typically equal to the ambient pressure. The plunger 152 is further connected to a wall 178 of a compression chamber 160. The compression chamber 160 is at a pressure $P_2$, which pressure $P_2$ is typically higher than the ambient pressure $P_1$ inside the chamber 148. This higher pressure $P_2$ in the compression chamber 160 creates a constant force as shown by the arrow 170 acting on the plunger 152. This constant force acting on the plunger 152 results in a requirement of a high initial force to move the plunger 152 when the electrical energy is supplied to the coils 142. The pressure compensation system is configured to balance this force 170 acting on the plunger 152 to reduce the requirement of a high initial force at the beginning of a stroke.

In one embodiment, the pressure compensation system includes a first pressure compensation chamber 156 in fluid communication with the compression chamber 160 and a second pressure chamber 158 in fluid communication with the ambient. The first pressure chamber 156 is connected to the compression chamber 160 through a first conduit 166. The first conduit 166 is connected to the compression chamber 160 through an opening 162 in the wall 178. The second pressure chamber 158 is connected to the ambient through the second conduit 168. In operation, the gas from the compression chamber 160 at higher pressure $P_2$ flows to the first pressure chamber 156 and the ambient air at ambient pressure $P_1$ flows to the second pressure chamber 158. Therefore, the force due to the pressure difference $(P_2-P_1)$ acting on the plunger 152 in the downward direction equals the force 170 acting on the plunger 152 in the opposite direction thereby balancing the force 170. The first and second pressure chambers 156 and 158 are separated from each other by a seal 174. The second pressure chamber 158 is separated from the compression chamber 160 by a seal 172. The first pressure chamber 156 is separated from the housing 150 by a seal 176. All these seals are used to prevent mixing of high pressure gas in the compression chamber 160 with ambient air.

Figure 10:
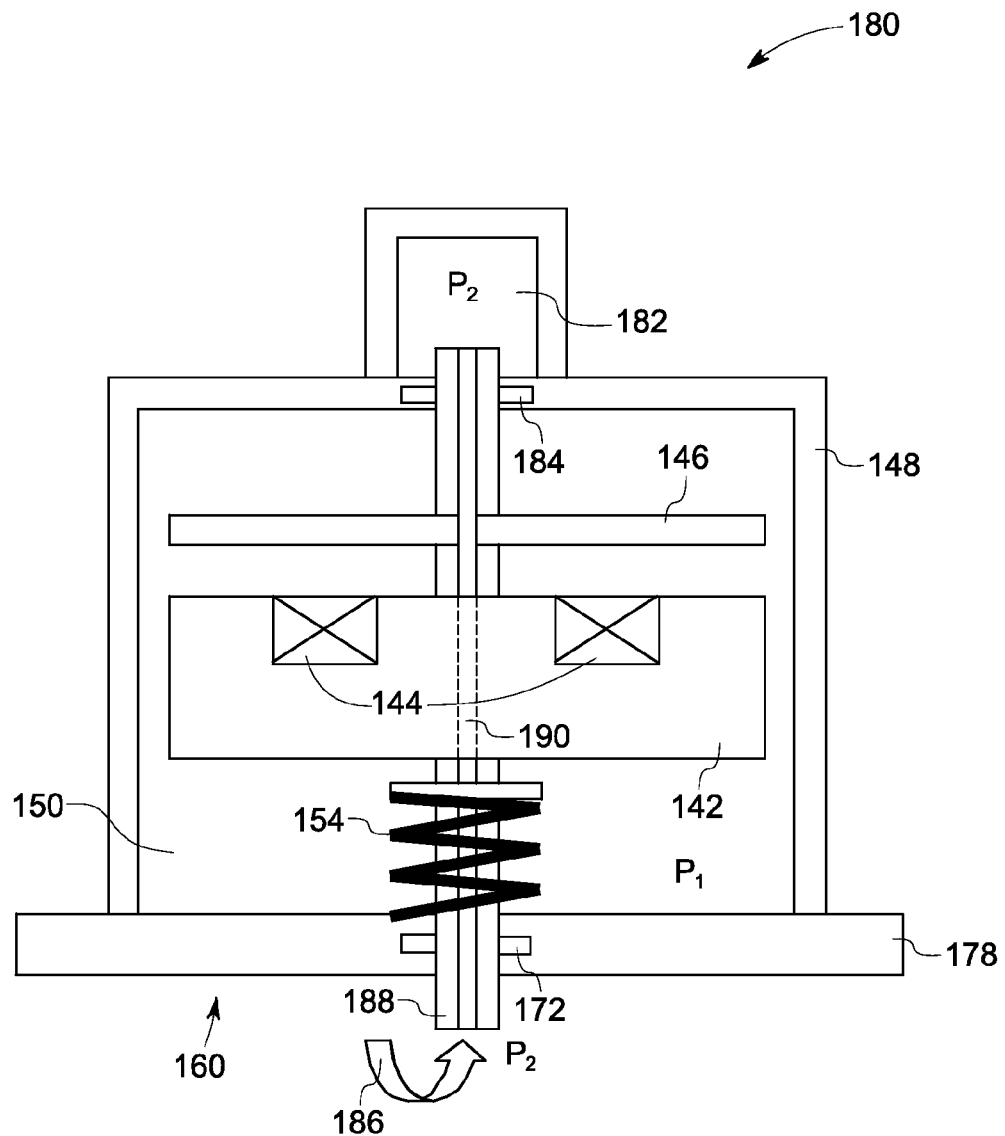
FIG. 10 illustrates another exemplary electromagnetic actuator with a pressure compensation system.

FIG. 10 illustrates yet another exemplary electromagnetic actuator 180 including a pressure compensation system. The pressure compensation system includes a top pressure chamber 182 disposed on top of the housing 148. The top pressure chamber 182 is in fluid communication with the compression chamber 160 through an exemplary plunger 188. The exemplary plunger 188 is configured to have a hollow passage 190 disposed within the plunger 188. The hollow passage 190 connects the compression chamber 160 with the top pressure chamber 182. In operation, the gas from the compression chamber 160 flows to the top pressure chamber 182 as shown by the arrow 186. Therefore, the pressure inside the top pressure chamber 182 is equal to pressure $P_2$ (the pressure inside the compression chamber 160). As a result, an equal force acts on the plunger 188 from top due to the gas at pressure $P_2$ in the top pressure chamber 182 and from the bottom due to the same pressure $P_2$ in the compression chamber 160. The top pressure chamber 182 is separated from the housing 148 by a seal 184.

Figure 11:
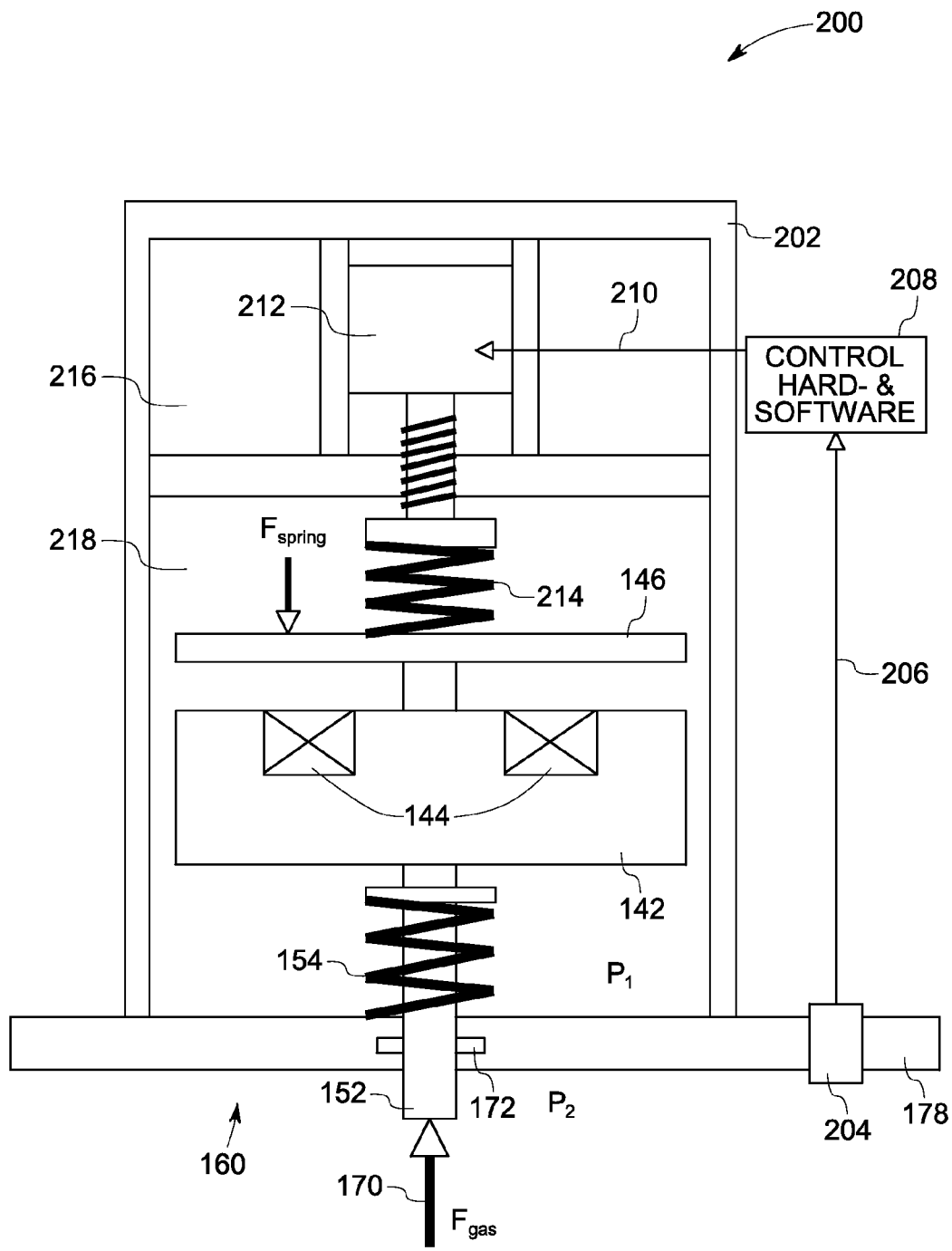
FIG. 11 illustrates yet another exemplary electromagnetic actuator with a pressure compensation system.

FIG. 11 illustrates yet another exemplary electromagnetic actuator 200 including a pressure compensation system. The actuator 200 is housed in an exemplary housing 202. The housing 202 includes a bottom portion of housing 218 including the anchor plate 146, core 142 and the bottom spring 154. The top portion 216 of the housing 202 includes a step motor 212 connected to a top spring 214. The top spring 214 is coupled to the anchor plate 146. The actuator 200 further includes a sensing device 204 in fluid communication with the compression chamber 160 to sense the pressure $P_2$ inside the compression chamber 160. The sensing device is also connected to a set of control hardware and software 208 connected to the step motor 212. In operation, the sensing device 204 senses the pressure $P_2$ inside the compression chamber 160 and sends a signal 206 to the set of hardware and software 208. The hardware and software 208, in turn, send another signal 210 to the step motor 212 to start building a spring force ($F_{spring}$) in the top spring 214 which spring force is equal to the gas force 170 ($F_{gas}$) acting on the plunger 152 from the bottom. In operation, these two equal forces acting in the opposite direction, $F_{spring}$ and $F_{gas}$ balance each other.

Figure 12:
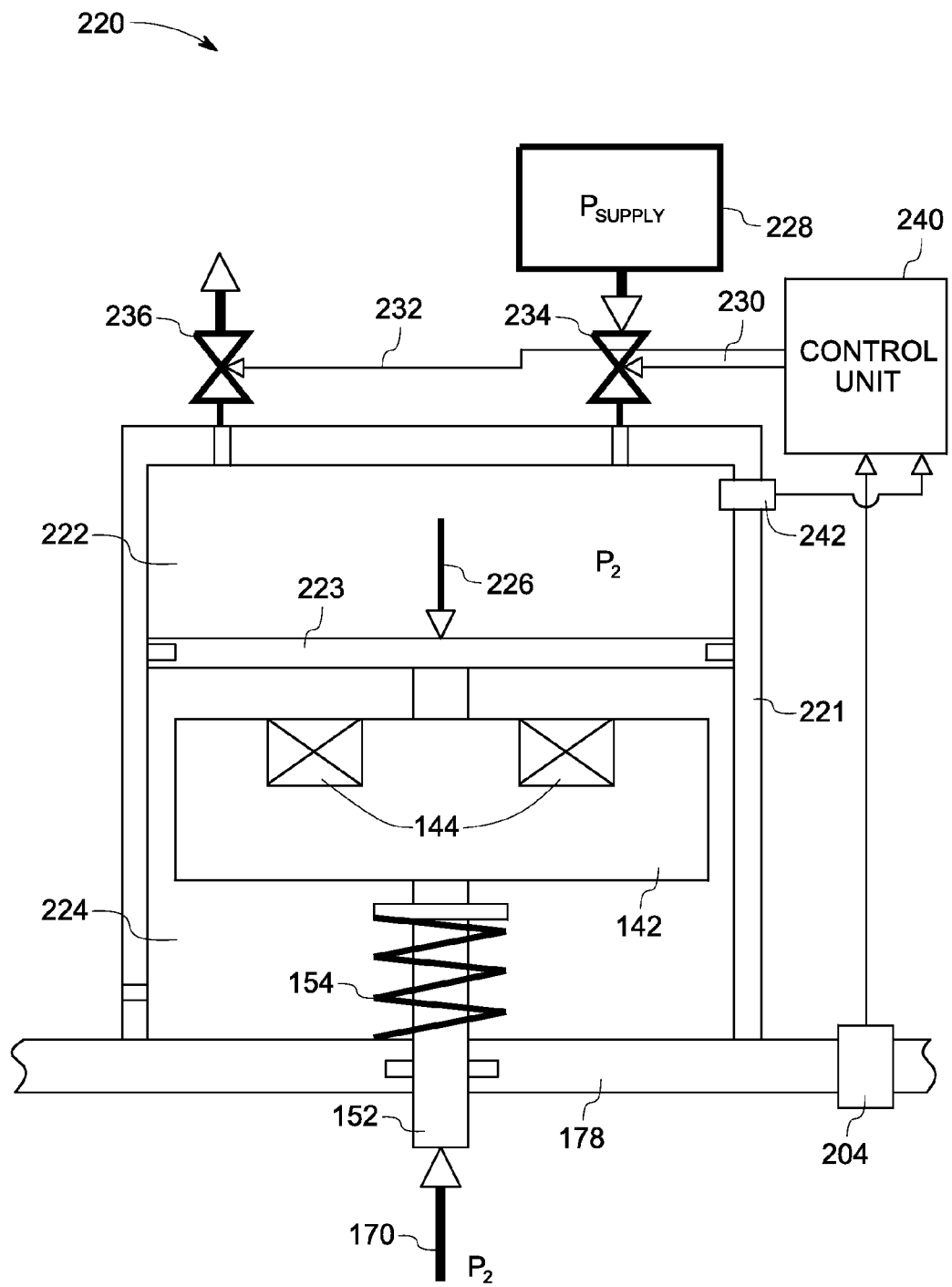
FIG. 12 illustrates another exemplary electromagnetic actuator with a pressure compensation system.

FIG. 12 illustrates yet another exemplary electromagnetic actuator 220 including a pressure compensation system. The actuator 220 is housed in an exemplary housing 221. The housing 221 includes a bottom portion of housing 224 including an anchor plate 223, the core 142 and the spring 154. The top portion 222 of the housing 202 is a pressure compensation chamber connected to an external gas supply chamber 228. The pressure compensation system further includes a gas supply valve 234 and a pressure release valve 236. A gas at high pressure is stored in the gas supply chamber 228. The gas supply chamber 228 is in fluid communication with the top portion of the housing 222. In operation, the sensing device 204 senses the pressure $P_2$ inside the compression chamber 160 and sends a signal 238 to a control unit 240. The control unit 240 is connected to the gas supply valve 234 and a release valve 236. The control unit 240 in turn sends a signal 230 to the supply valve 234, which supply valve 234 opens to allow the high pressure gas to flow from the supply chamber 228 to the top portion 222 of the housing 221. A sensing device 242 measures the pressure $P_2$ inside the compensation chamber 222 and sends a signal to the control unit 240. The flow of the gas from the supply chamber 228 continues untill the force 226 acting on the anchor plate 223 equals the force 170 acting on the plunger 152 from the bottom in the compression chamber 160. In case, the pressure inside the top portion of the housing 222 exceeds a point, wherein the force 226 acting on the anchor plate 223 is more than the force 170 acting on the plunger from the bottom, the release valve 236 receives a signal 232 from the control unit 240 and opens to release a portion of the high pressure gas inside the top portion of the housing 222 so that the forces 226 and 170 becomes equal.

Figure 13:
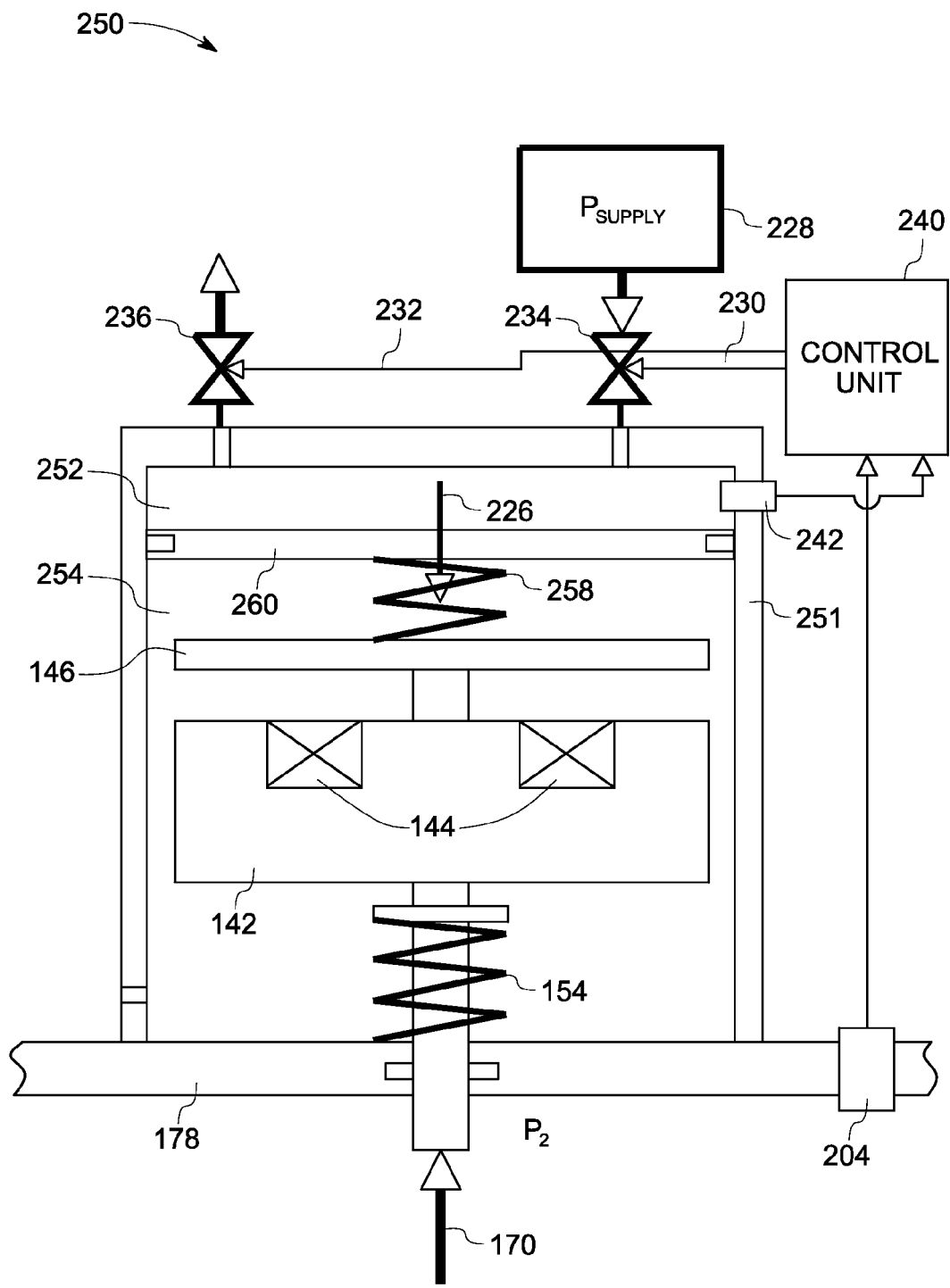
FIG. 13 illustrates an exemplary electromagnetic actuator with a pressure compensation system with an additional spring.

FIG. 13 illustrates yet another exemplary electromagnetic actuator 250 including a pressure compensation system. The actuator 250 is housed in an exemplary housing 251. The housing 251 includes a bottom portion of housing 254 including the anchor plate 146, core 142, a bottom spring 154 and a top spring 258 connected to the anchor plate 146. The force 226 developed by the gas supplied by the supply chamber 228 acts on the top spring 258 instead of directly acting on the anchor plate 146 as shown in FIG. 10. A piston 260 separating the top portion 252 and the bottom portion 254 of the housing 251 is connected to the top spring 258. Operationally, once the gas is supplied to the top portion 252 from the gas supply chamber 258, the piston 260 moves towards the top spring 258 to exert a force 226, which force 226 is controlled to be equal to the force 170 acting on the plunger from the bottom. The advantage of this concept compared to the one of FIG. 12 is that the piston 260 stays more or less in a fixed position, which reduces the dynamic load on the sealing of the piston 260. The dynamically changing force is provided by the top spring 258, which can rapidly expand and compress according to its load. Additionally, the whole system of pressurized chamber and top spring can be designed to act as a damping component.

Figure 14:
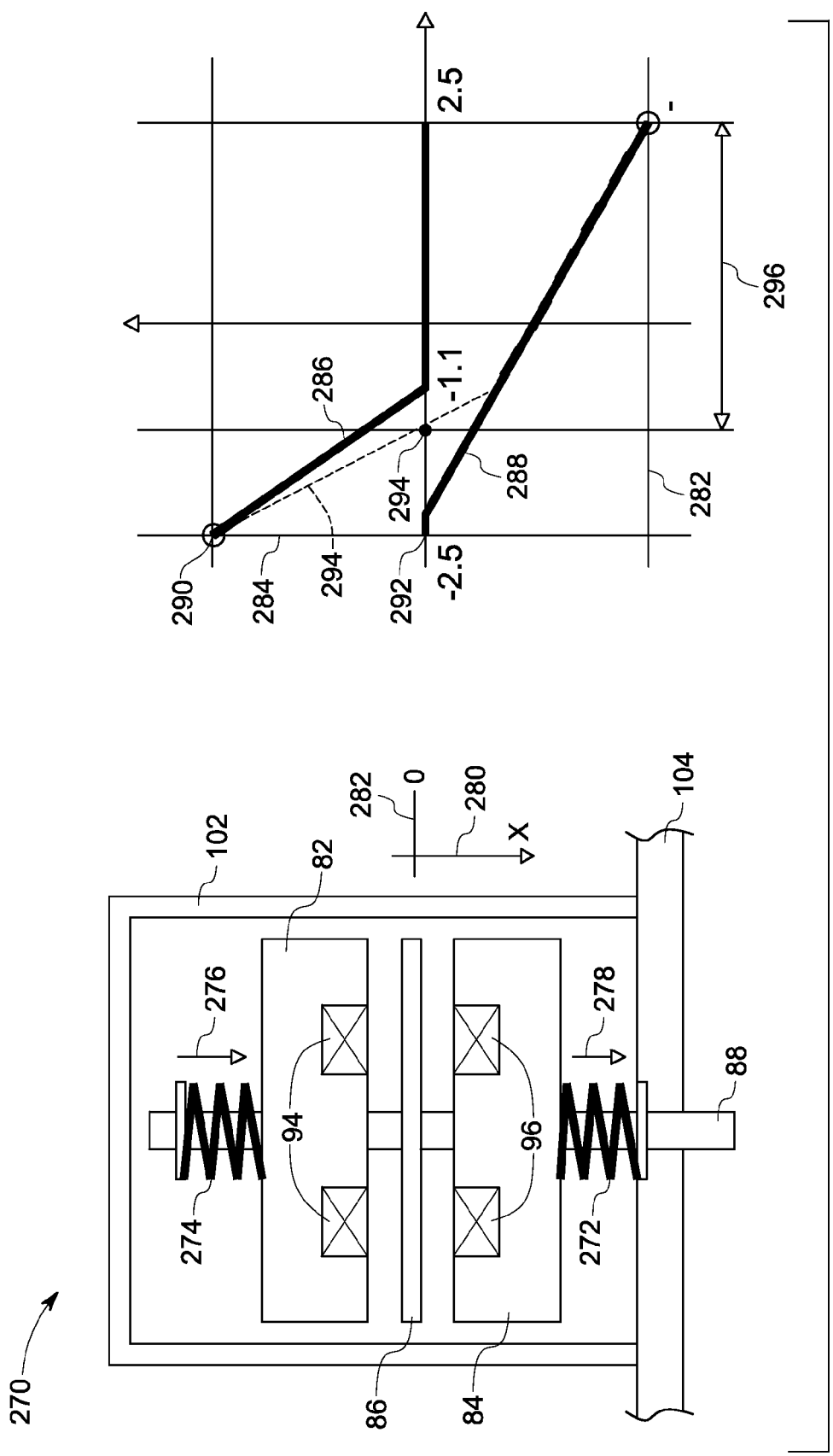
FIG. 14 illustrates an exemplary electromagnetic actuator with a fail safe position of the springs.

FIG. 14 illustrates an exemplary bi-directional actuator 270 configured to obtain a failsafe position when electricity is turned off. The design of the actuator 270 is similar to that shown in FIG. 5 with additional features in the design of the top spring 274 and bottom spring 272 to achieve a failsafe position when the electricity is turned off. For the unidirectional design, fail-safe position of the actuator is always guarantied, because as soon as the electricity is turned off, the spring pushes the anchor plate away from the core and the actuator achieves the "off" position. But in the bi-directional design as shown in FIG. 5, when electricity is turned off the anchor plate 86 may achieve an undefined position due to the presence of two cores with two sets of coils disposed within. Therefore it is very important to design the bi-directional actuators in such a manner that when the electricity is turned off, the actuator should be able to achieve an "off" position automatically.

In the exemplary actuator 270 as shown in FIG. 14, proper fail-safe position can be achieved by adjustment of the stiffness of the first spring or top spring 274 and the second spring or bottom spring 272. The plot as shown in FIG. 14 shows the position of the anchor plate 86 plotted along the horizontal "x" axis 282 against the force acting on the springs along the vertical "y" axis 284. A line 286 shows the characteristics of the bottom spring 272 and another line 288 shows the characteristics of the top spring 274. When the electricity is turned off, in absence of any magnetic force, the only force acting on the actuator is the sum of the forces developed in the top and the bottom springs 272 and 274 respectively. The slope of the curve 286 determines the stiffness of the bottom spring 272 and the slope of the curve 288 determines the stiffness of the top spring 274. The sum of the forces within the actuator is obtained by adding the lines 286 and 288 to achieve a line 294. In the plot, line 292 represents a zero force line as shown by the position 282 of the anchor plate. The line 294 meets the zero force line 292 in the plot at the point 298. The intersection point 298 is achieved at a position of −1.1, which negative value in the "x" axis determines the position of the anchor plate at a position little lower than the "o" position 282 and ensures a fail safe position of the actuator once the electricity is turned off.

Figure 15:
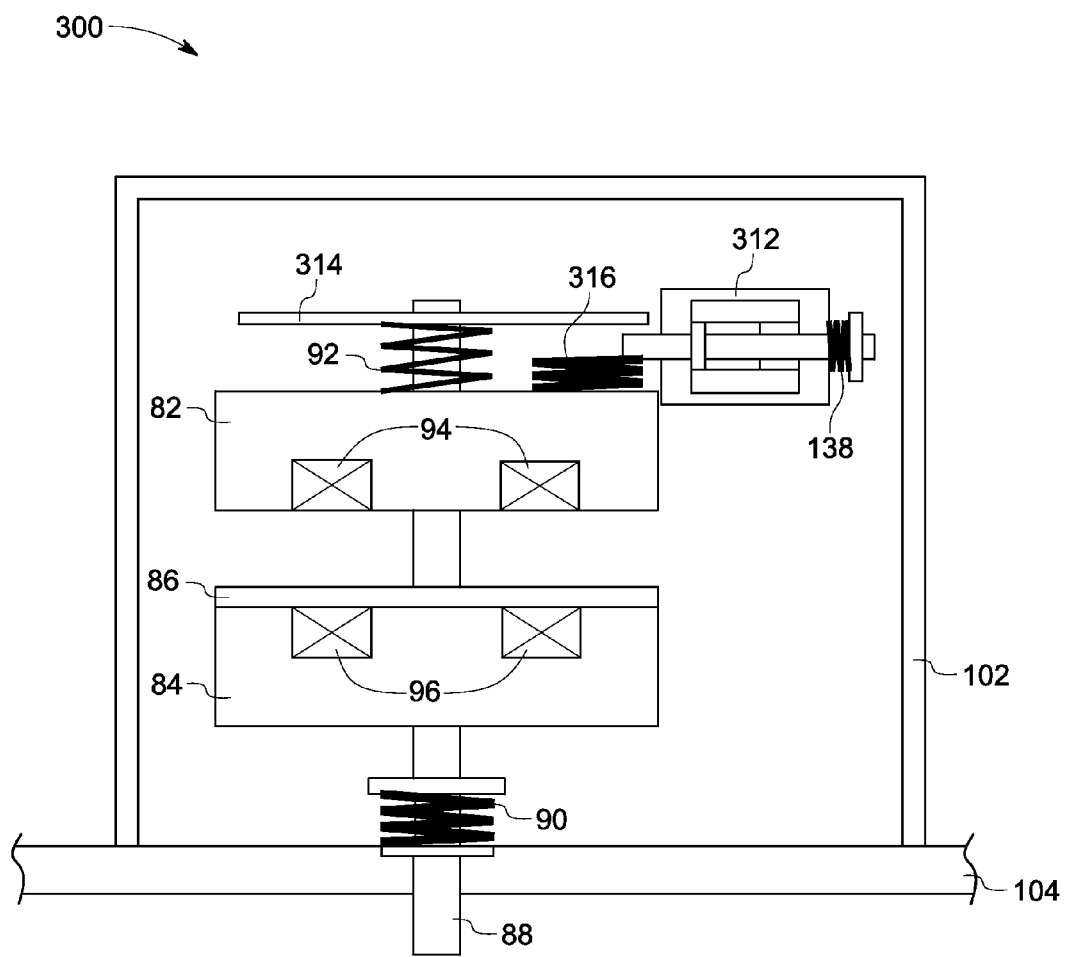
FIG. 15 illustrates an exemplary electromagnetic actuator with a fail safe design using an additional lock solenoid.
Figure 16:
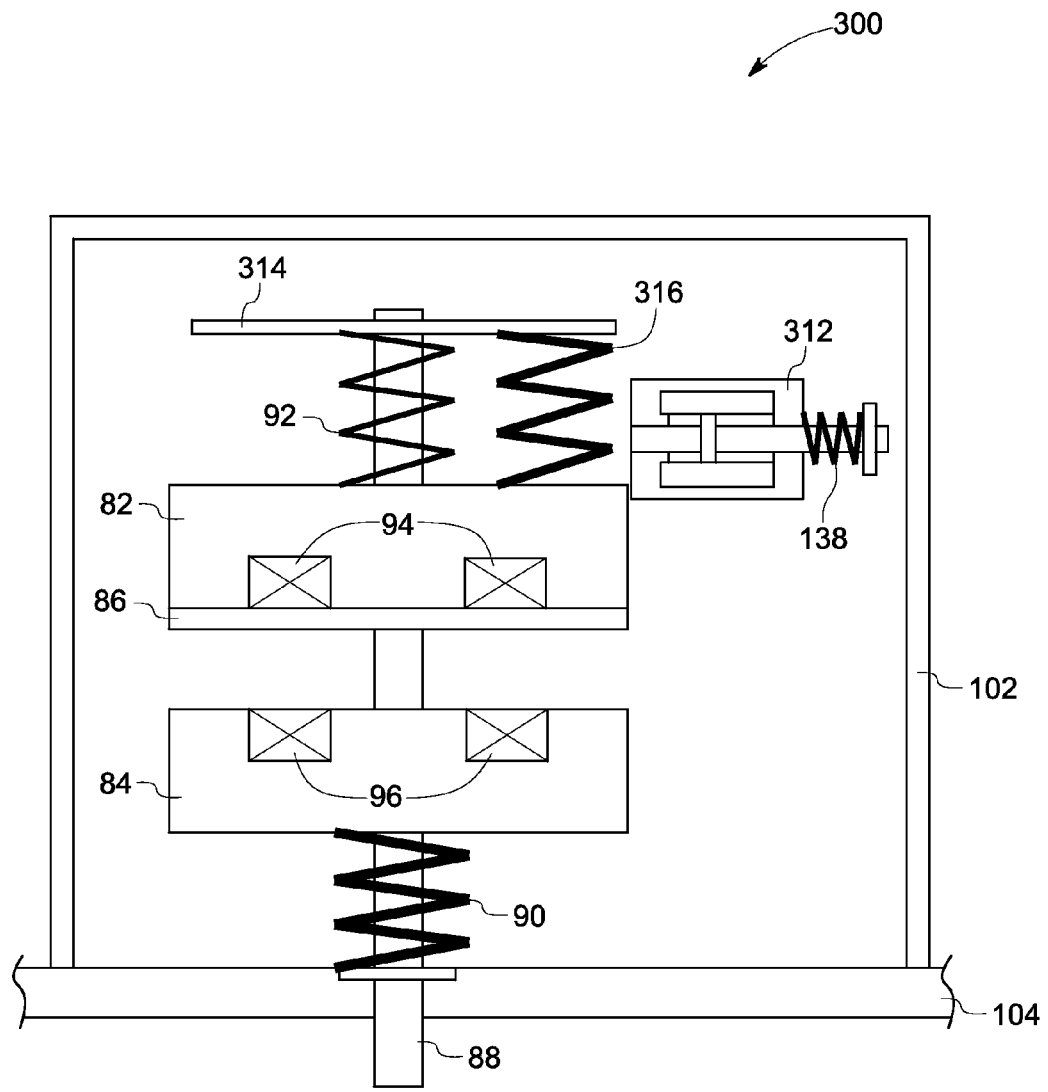
FIG. 16 illustrates an exemplary electromagnetic actuator with a fail safe design using an additional lock solenoid in closed position.

FIGS. 15 and 16 show an exemplary actuator 300 similar to the bi-directional actuator 80 shown in FIG. 5 with an addition lock solenoid 312 configured to achieve the fail-safe position once the electricity is turned off. The actuator 300 also includes a second anchor plate 314 connected to the first spring 92. The lock solenoid 312 is attached to two lock springs 316 and 318. FIG. 15 illustrates the actuator 300 in an "on" position, when the electricity is supplied to the set of coils 96 and the anchor plate 86 is pulled towards the second core 84. Electricity from the same power source is supplied to the lock solenoid 312 and the lock spring 318 is pushed towards the lock solenoid 312 thereby pushing the lock spring 316 in a compressed position.

FIG. 16 illustrates the exemplary actuator 300 when the electricity is turned off and the actuator 300 achieves a failsafe "off" position. In operation, when the electricity is turned off, the lock springs 316 and 318 expand thereby pushing the anchor plate 86 towards the first core 82 to achieve the failsafe "off" position.

Figure 17:
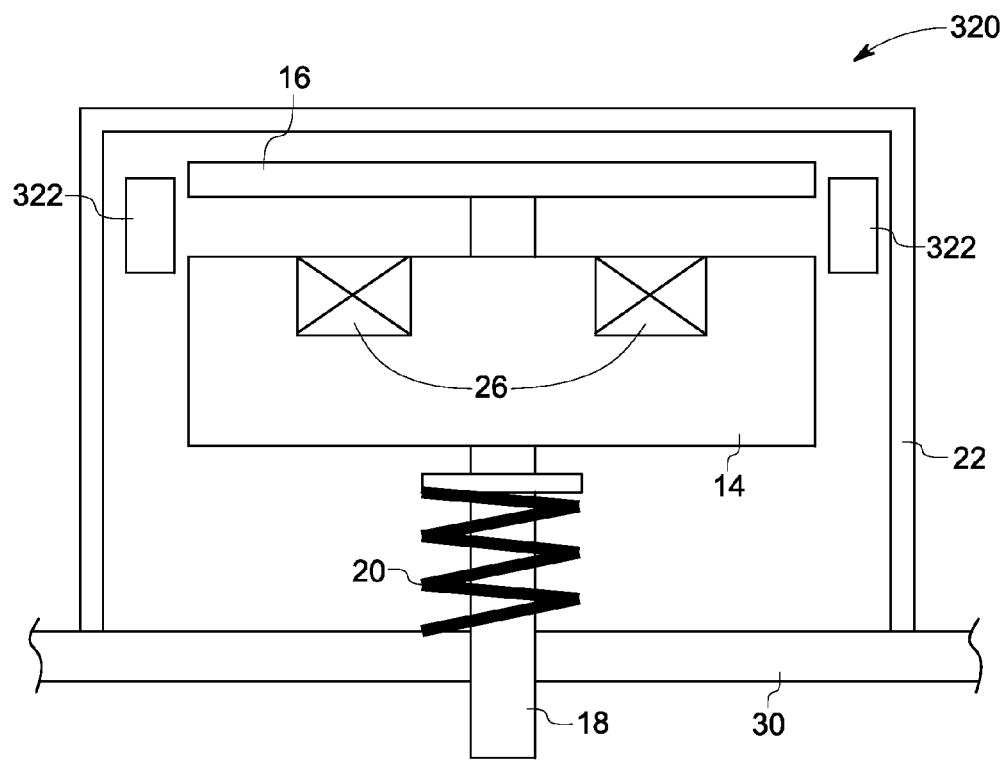
FIG. 17 illustrates an exemplary electromagnetic actuator with permanent magnets.
Figure 18:
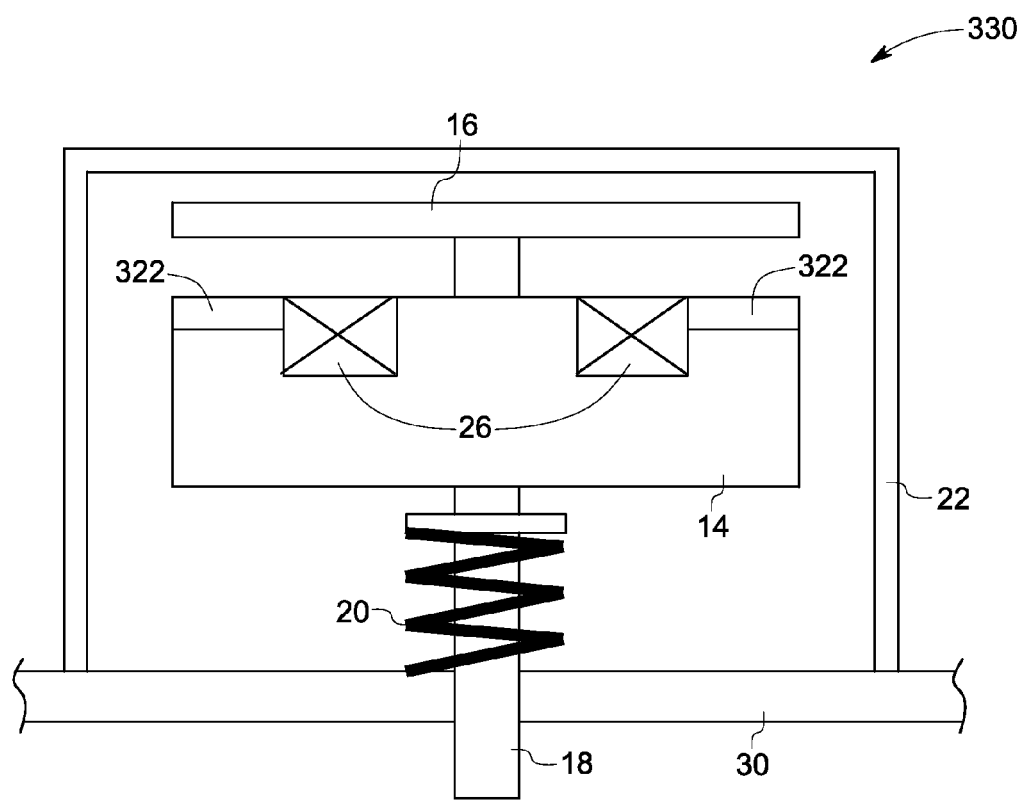
FIG. 18 illustrates another exemplary electromagnetic actuator with permanent magnets.

FIGS. 17 and 18 illustrate exemplary actuators 320 and 330 of unidirectional design as shown in FIG. 1 with additional permanent magnets to develop a stronger magnetic force during actuation. As shown in FIG. 17, one or more permanent magnets 322 can be inserted into actuator housing to reduce the current demand during the hold phase, wherein a significant amount of magnetic force is provided by the permanent magnets. The exemplary actuator 320 as shown in FIG. 17, may develop high initial force at the beginning of the stroke as the permanent magnet 322 are placed closer to the anchor plate 16. However once the anchor plate 16 is close to the core 14, more current will be needed to keep the anchor plate 16 in the hold position (close to the core 14) as the magnetic flux from the permanent magnets due to their different orientation do not contribute to hold the plunger 18 close to the core 14. FIG. 18 shows another exemplary actuator 330, wherein one or more permanent magnets 322 are disposed within the core 14 to enhance the magnetic forces developed in the actuation process. In the exemplary actuator 330, the permanent magnets 322 contribute to the magnetic flux generated in the core 14 as the permanent magnets 322 are disposed within the core. Therefore, the initial force generated by this core when the coils 26 are energized are low due to the distance of the plunger 16 and the core 14. However at the end of the stroke, when the plunger 18 is close to the core 14, less current is needed (compared to the embodiment shown in FIG. 17 to hold the plunger 16 close to the core 14.

In all the actuators described, in operation, the velocity developed by the plunger needs to be controlled without sacrificing the actuation speed of the valves of the compressors. A higher impact velocity of the plunger may damage the actuator due to the force created by the impact velocity at the end of the stroke. To reduce the impact velocity of plunger, electrical, hydraulic, pneumatic or mechanical damping may be applied. Proper mechanical damping can be achieved by inserting a piece of material of high mechanical resistance into the kinetic path of the plunger. For electrical damping, the application of the current that is supplied to the solenoid for actuation of the valve may be controlled in such a manner that a fast actuation is achieved with low impact velocities.

Figure 19:
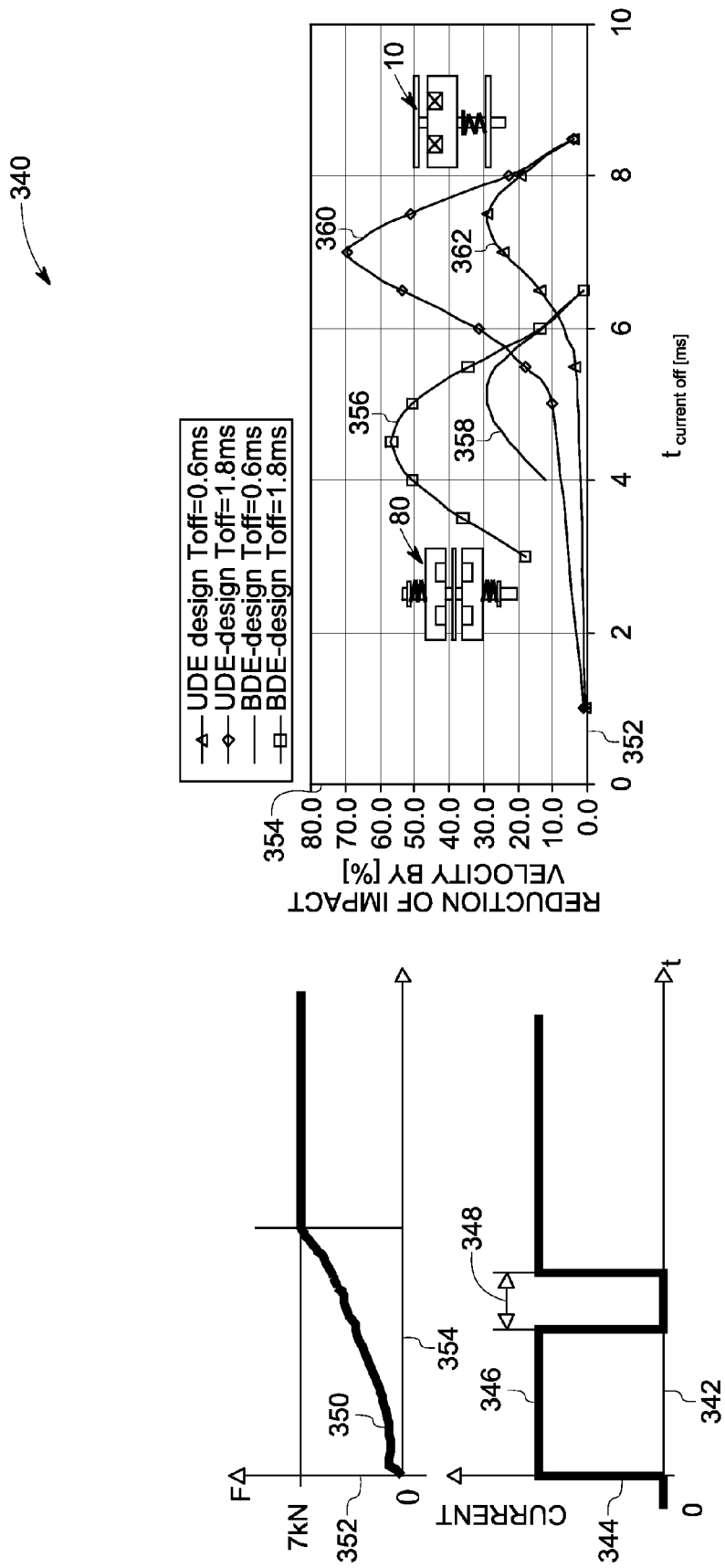
FIG. 19 illustrates an electrical damping method to reduce impact of the solenoids in a electromagnetic actuator.

FIG. 19 illustrates the reduction of impact velocity of the plunger by controlling the supply of current to the solenoid. As shown in FIG. 19, time is plotted in the horizontal axis 342 against the supply of current in the vertical axis 344. Initially the current is supplied continuously as shown by the line 346 and close to the end of the stroke the current is turned off for a duration of time (hereinafter noted as $T_{off}$) as shown by 348. The force acting on the plunger is plotted in the vertical axis 352 against the horizontal time axis 354. The curve 350 demonstrates the characteristic time development of the force on the plunger. This time interval $T_{off}$ during which the current is switched off can reduce the impact velocity if the duration $T_{off}$ as well as the timing of this off-phase ($t_{currentoff}$) is chosen optimally.

The percent reduction of the impact velocity due to this electrical damping method is plotted in the vertical axis 354 against the timing of the current shut off phase $t_{currentoff}$ in the horizontal axis 352. Curves 360 and 362 illustrate the percent reduction in impact velocity for the actuator with unidirectional design (as shown in FIG. 1) for different duration of the current shut off phase $T_{off}$. Curves 356 and 358 illustrate the percent reduction in impact velocity for the actuator with bi-directional design (as shown in FIG. 5). These plots clearly identify an optimum time for the shut off phase $t_{currentoff}$ for a given shut off duration $T_{off}$.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

What is claimed is:

1. A valve comprising an electromagnetic actuator, said electro magnetic actuator comprising:
   a solenoid comprising:
   at least one core, said at least one core is an "E" shaped core or a "U" shaped core;
   an anchor plate; and
   at least one coil disposed within said at least one core and connected to a set of power electronics to supply current to said coils;
   a plunger connected to said anchor plate;
   at least one spring configured to guide said plunger;
   wherein opening and closing of said valve is controlled by passing current through said at least one coil and said valve is used in a compressor; and
   said at least one core is configured to have spikes at both sides to generate a resistance force at the beginning of a stroke of said plunger.

2. The valve of claim 1, wherein said valve is used as a suction valve in said compressor.

3. The valve of claim 1, wherein said at least one spring is a helical spring or a plate spring.

4. The valve of claim 1, wherein said solenoid is unidirectional.

5. The valve of claim 1, wherein said solenoid comprises a first core and a first spring and a second core and a second spring and said anchor plate is disposed in between said first and second cores.

6. The valve of claim 5, wherein said solenoid is bi-directional.

7. A valve comprising an electromagnetic actuator, said electro magnetic actuator comprising:
   a solenoid comprising:
   at least one core, said at least one core is an "E" shaped core or a "U" shaped core;
   an anchor plate; and
   at least one coil disposed within said at least one core and connected to a set of power electronics to supply current to said coils;
   a plunger connected to said anchor plate; and
   at least one spring configured to guide said plunger;
   wherein opening and closing of said valve is controlled by passing current through said at least one coil and said valve is used as a suction valve in a compressor; and
   wherein said at least one core is configured to have spikes at both sides to generate a high force at the beginning of a stroke of said plunger.

8. The valve of claim 7, wherein said at least one spring is a helical spring or a plate spring.

9. The valve of claim 7, wherein said solenoid is unidirectional.

10. The valve of claim 7, wherein said solenoid comprises a first core and a first spring and a second core and a second spring and said anchor plate is disposed in between said first and second cores.

11. The valve of claim 10, wherein said solenoid is bi-directional.

12. The valve of claim 7, wherein one of said first core and second iron core is configured to have spikes at both sides to generate a high force at the beginning of a stroke.

13. A valve comprising an electromagnetic actuator, said electro magnetic actuator comprising:

a solenoid comprising:

a first core and a first spring and a second core and a second spring and an anchor plate disposed in between said first and second cores, wherein said first core and second core are "E" shaped cores or "U" shaped cores; and a first coil disposed within said first core and a second coil disposed within said second core wherein said first and second coils are connected to a set of power electronics to supply current to said first and second coils;

a plunger connected to said anchor plate; and at least one spring configured to guide said plunger;

wherein opening and closing of said valve is controlled by passing current through said first coil and second coil and said valve is used as a suction valve in a compressor; and wherein one of said first core and second iron core is configured to have spikes at both sides to generate a resistance force at the beginning of a stroke.

14. The valve of claim 13, wherein said solenoid is bi-directional.

* * * * *

UNITED STATES PATENT AND TRADEMARK OFFICE
CERTIFICATE OF CORRECTION

PATENT NO. : 7,516,940 B2  Page 1 of 1
APPLICATION NO. : 11/420590
DATED : April 14, 2009
INVENTOR(S) : Kopecek et al.

It is certified that error appears in the above-identified patent and that said Letters Patent is hereby corrected as shown below:

On the Title Page, in item (75), under "Inventors", delete "Florence (IT)" and insert -- Firenze (IT) --, therefor.

On the Title Page, in item (57), under "ABSTRACT", in Column 2, Line 10, delete "acompressor." and insert -- a compressor. --, therefor.

Signed and Sealed this

Seventh Day of July, 2009

JOHN DOLL
*Acting Director of the United States Patent and Trademark Office*